United States Patent [19]

Kaku

[11] Patent Number: 4,672,630
[45] Date of Patent: Jun. 9, 1987

[54] TRAINING METHOD OF DATA RECEIVING EQUIPMENT

[75] Inventor: Takashi Kaku, Tama, Japan

[73] Assignee: Fujitsu Limited, Kawasaki, Japan

[21] Appl. No.: 842,355

[22] PCT Filed: Jun. 15, 1983

[86] PCT No.: PCT/JP83/00191
§ 371 Date: Feb. 17, 1984
§ 102(e) Date: Feb. 17, 1984

[87] PCT Pub. No.: WO84/00090
PCT Pub. Date: Jan. 5, 1984

Related U.S. Application Data

[63] Continuation of Ser. No. 589,089, Feb. 17, 1984, abandoned.

[30] Foreign Application Priority Data

Jun. 17, 1982 [JP] Japan .................. 57-104560

[51] Int. Cl.4 ............................. H04B 3/04
[52] U.S. Cl. .................... 375/13; 375/12; 375/14; 375/15

[58] Field of Search ............ 333/18; 375/12, 13, 375/14, 15

[56] References Cited

U.S. PATENT DOCUMENTS

| | | | |
|---|---|---|---|
| 4,044,307 | 8/1977 | Borysiewicz | 375/13 |
| 4,320,517 | 3/1982 | Godard et al. | 375/13 |
| 4,433,425 | 2/1984 | Bogèna de Jaeger | 375/13 |
| 4,489,416 | 12/1984 | Stuart | 375/13 |
| 4,571,733 | 2/1986 | Kaku et al. | 375/13 |
| 4,608,703 | 8/1986 | Kaga et al. | 375/13 |
| 4,621,366 | 11/1986 | Cain et al. | 375/13 |

*Primary Examiner*—Benedict V. Safourek
*Assistant Examiner*—Elissa Seidenglanz
*Attorney, Agent, or Firm*—Staas & Halsey

[57] ABSTRACT

Data receiving equipment is trained by training signal of optimum length through the steps that the sending equipment sends data signal after sending the training signal having a length corresponding to the characteristics of a line connected thereto and containing information indicating the length and the receiving equipment trains itself with the received training signal and detects, using the information indicating the length, the timing when the training signal changes to a data signal.

5 Claims, 7 Drawing Figures

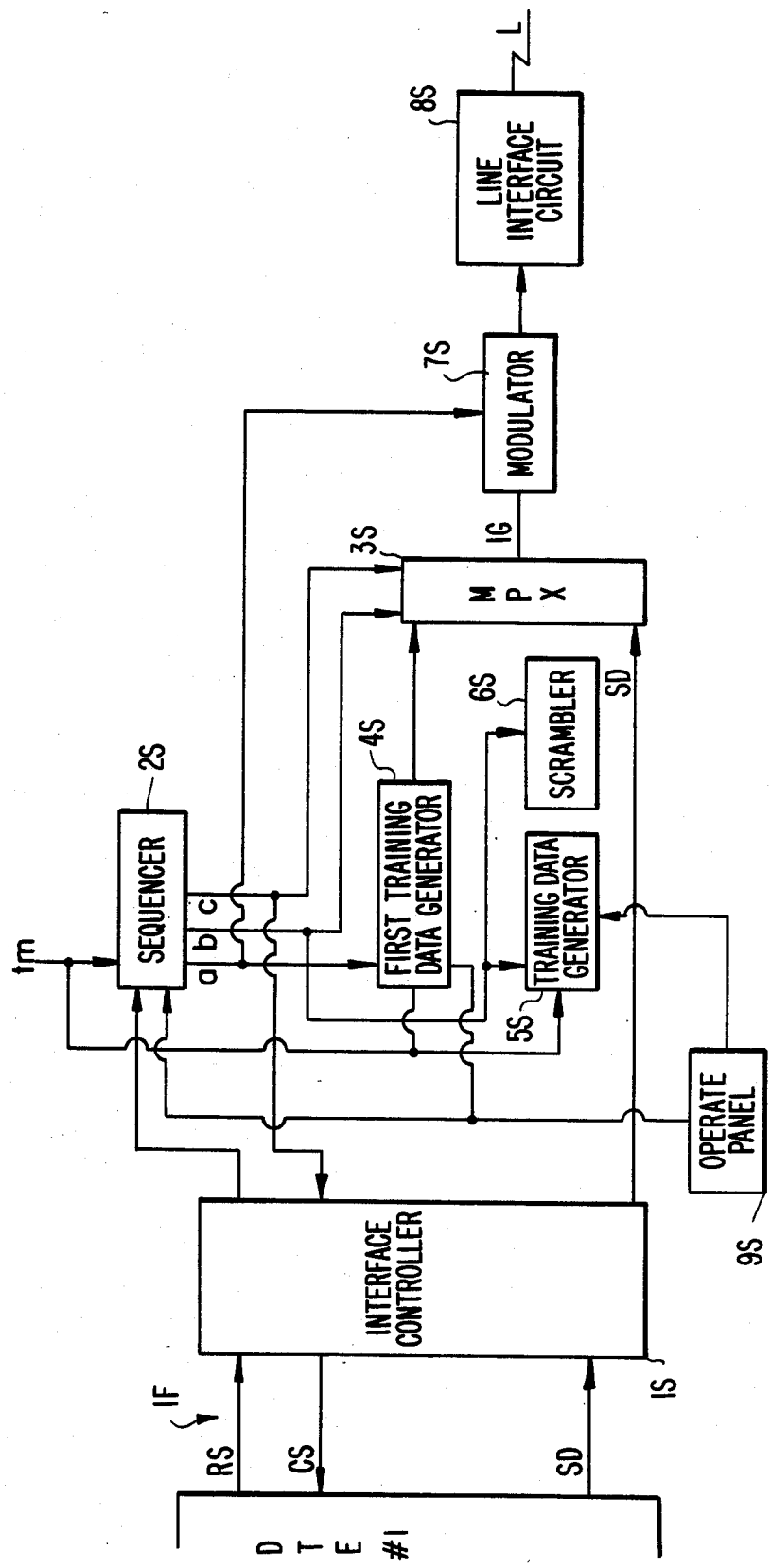

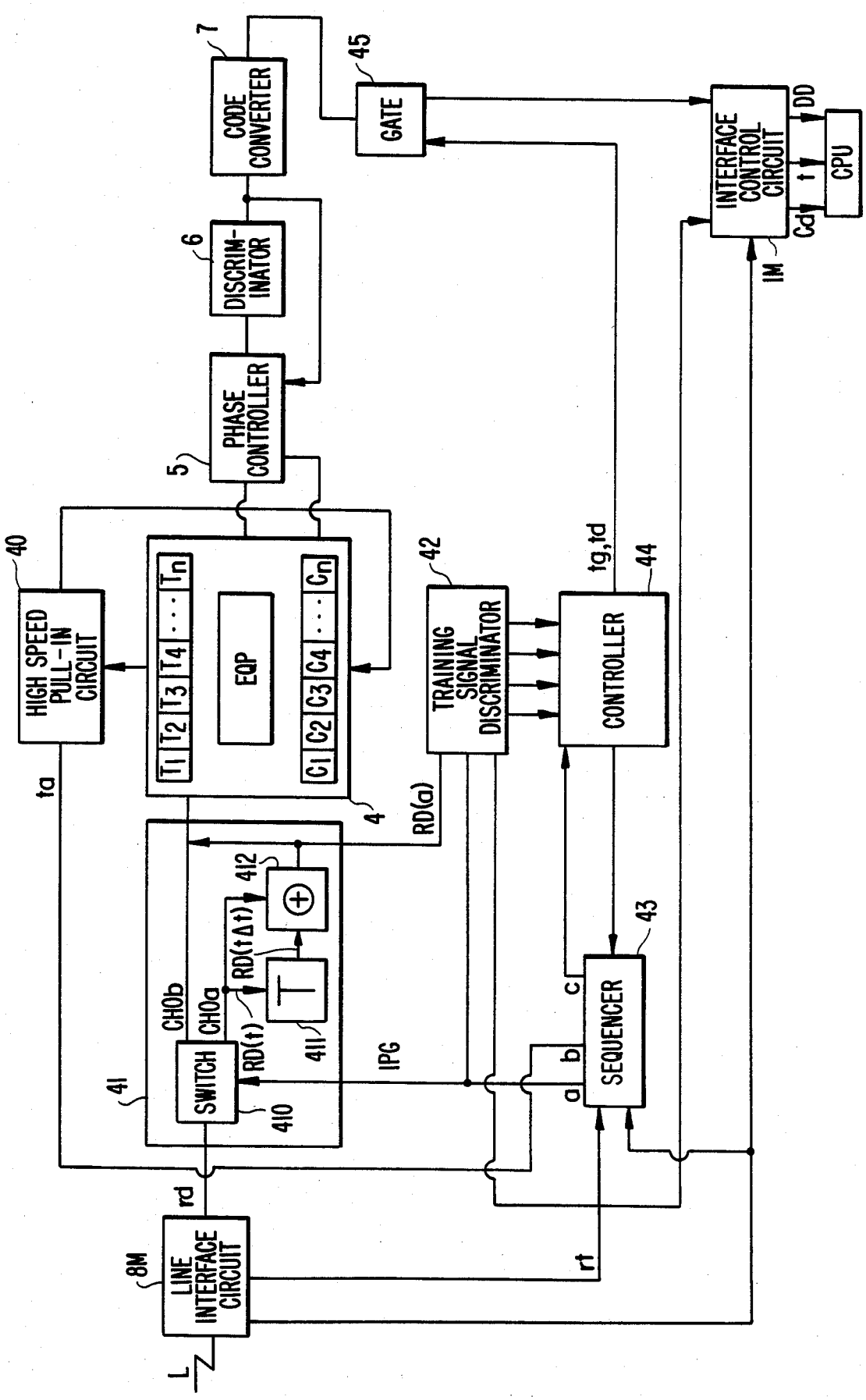

TRAINING METHOD OF DATA RECEIVING EQUIPMENT

This is a continuation of co-pending application Ser. No. 589,089 filed on Feb. 17, 1984 now abandoned.

DESCRIPTION

TECHNICAL FIELD

This invention relates to a training method for making ready the data transmission and reception by training a modulator/demodulator (hereinafter referred to as modem) connected through the transmission line with a training signal, and particularly to a training method of data receiving equipment which facilitates the training within the optimum time for the transmission line by utilizing a training signal corresponding to line characteristic of the line employing the modulation system such as orthogonal phase modulation.

BACKGROUND ART

In such a communication system which realizes communications between modems connected through transmission lines, it is generally known that the modems in communication are synchronized at least during data transmission and reception between the sending terminal and receiving terminal connected to the respective modems and the modem in the receiving side is capable of equalizing the line characteristic.

In view of meeting such conditions, a training signal of a predetermined constant pattern containing at least a binary random data signal is transmitted from the modem in the sending side just before actual data transfer from, for example, the terminal in order to train the modem in the receiving side and thereby the receiving modem is placed in a condition matching said respective conditions just before transmission and reception of data between terminals.

However, such a conventional training method has a disadvantage in that the length of training signal is fixed and such a length must be sufficiently long so that the modem in the receiving side can be trained perfectly even, in case line characteristics are different.

Meanwhile, it has been proposed to realize communication between a modem in the center and a plurality of modems by connecting such a modem and the modems provided in a plurality of terminals.

In such a communication system the distance from the center modem to each terminal is different. Therefore, the conventional training method explained above requires longer training times before the start of data transmission from the terminals; and such times have not been employed for such a communication system because the time is determined in accordance with the transmission line having the worst line characteristic.

On the other hand, as a training method which assures very high speed training, the method disclosed in the specification of U.S. Pat. No. 3,962,637 is known.

FIGS. 1(a) and (b) show the conventional training method explained above. FIG. 1(a) indicates the block diagram of a modem, while FIG. 1(b) indicates the pattern of a training signal.

In FIG. 1(a), numeral 1 indicates an automatic gain controller (AGC), while 2 indicates a demodulating circuit, 3 indicates a roll-off filter, 4 denotes an equalizer, 5 indicates a phase controller, 6 indicates a discriminator, 7 deontes a code converter, 40 indicates a high speed pull-in circuit, 8 indicates a timing generator, and 9 indicates a carrier detector.

In FIG. 1(b), "tone" means a tone signal, "tim" means a timing signal, "imp" means an impulse, "dat" means a data and T0~T7 respectively indicate times.

A training means will be explained hereunder.

First, a training signal shown in FIG. 1(b) is sent from the sending side (now shown).

The modem in the receiving side causes, at first, the AGC 1 and pulling of phase of signal using the tone signal starting from the time T0 and obtains a detecting output CD from the detector 9.

The phase of the carrier signal is adjusted by the timing signal "tim" starting from the time T1 and the send timing is pulled by timing generator 8.

The impulse signal "imp" appearing between the time T3 and T6 of the training signal contains impulses i1 and i2 which are synchronized with the timing of data and provided with no-signal period in both sides.

This signal is supplied to the high speed pull-in circuit 40 from the phase controller 5. The high speed pull-in circuit 40 discriminates line characteristics by operating on components of distortion in the impulses i1 and i2; initializes the equalization coefficient of equalizer 4; fine-adjusts the phase controller 5; and moreover resets the code converter 7.

As explained above, the training of the receiving side continues until the time T6. The signal received during the next data "dat" period is gain-adjusted by the AGC 1, demodulated by the demodulator 2 and converted to the base band by the roll-off filter 3. The base band signal is subjected to elimination of line distortion in accordance with the line characteristic by the phase controller 5. After line distortion is eliminated, the base band signal is then subjected to data discrimination, decoded by the code converter 7 and supplied as a receiving data RD to the receiving terminal. According to this patent, a high speed pull-in, namely training is possible.

But, if the line characteristic is bad, this method cannot sufficiently equalize line distortion. Therefore, it is also proposed to add a binary random code in addition to this signal in such a communication system where various line characteristics exist.

However, when this method is introduced into the communication system where various line characteristics exist, the length of the training signal is fixed in order to discriminate the timing where the training signal and the data signal change in the receiving side in any of the conventional proposes. Moreover, the training is carried out using the training signal in the sufficient length for the modem to pull in the line having the worst line characteristic.

Therefore, even in the line having a good line characteristic, this method provides the disadvantage that, the time from starting the transmission of the training signal to being ready for sending the data signal, depends on such time of the line having the worst line characteristic.

SUMMARY OF THE INVENTION

It is an object of the present invention to provide a training method of data receiving equipment which has realized high speed pull-in, through the training, within the optimum period for each line in view of eliminating disadvantages of conventional methods described above.

The present invention is characterized in that data indicating the length of the training signal is included in the training signal, followed by a data signal, for training the data receiving equipment. The receiving equipment trains itself in accordance with the training signal and discriminates the length of the training signal and switches from training to receiving data signals based on the training signal length information.

The present invention will be understood more definitely from the explanation hereunder by way of the attached drawings.

BRIEF DESCRIPTION OF DRAWINGS

FIG. 4(a) is a block diagram of a modem in the sending side (sending modem) which represents an embodiment of the present invention.

FIG. 4(b) is a block diagram of a modem in the receiving side (receiving modem) representing an embodiment of the present invention.

DETAILED DESCRIPTION OF THE PREFERRED EMBODIMENT

FIGS. 2(a)-(d) indicate formats of respective training signals. TR1 means the first training signal and TR2 indicates the second training signal.

The first training signal basically utilizes the technology disclosed in the specification of the above-described U.S. patent. Namely, the first training signal TR1 contains the carrier signal component, timing signal component and impulse signal component and thereby initializes (trains) the AGC located in the sending modem, carrier generating circuit, phase controlling circuit, timing signal generating circuit, equalizer and code converter used in the demodulator. In addition, the second training signal TR2 uses a binary random code and is obtained by modulating the carrier.

Each circuit initialized (trained) by the first training signal TR1 is fine-trained, moreover, by the second training signal TR2.

Further, in the present invention, the length of the second training signal TR2 can be discriminated from the first training signal TR1.

Figure 2:
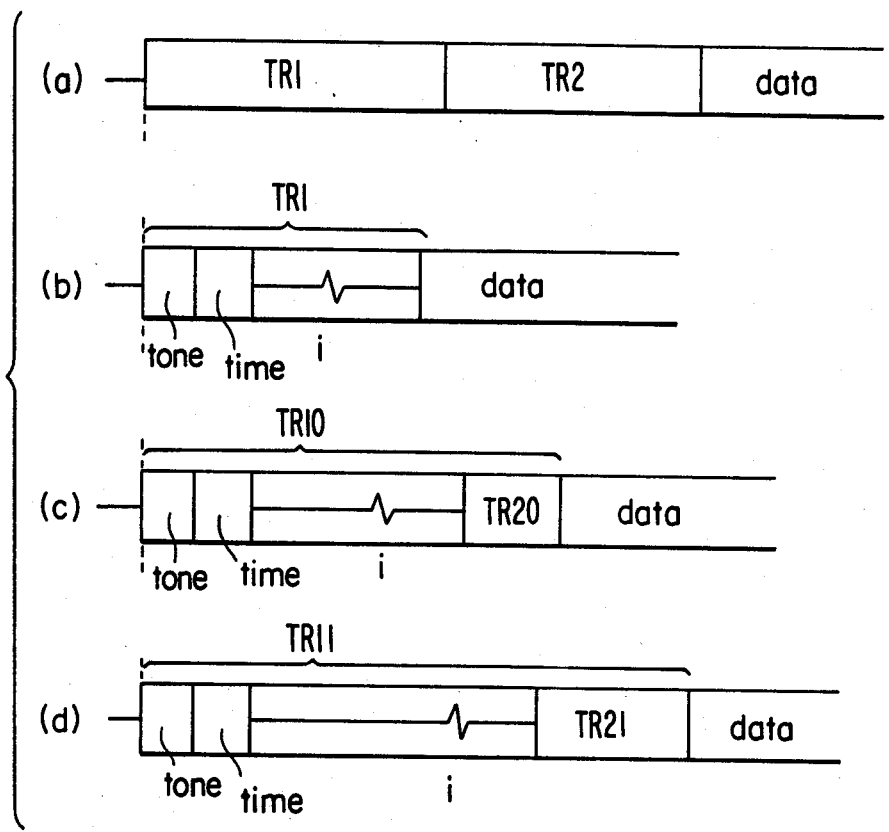
FIGS. 2(a)-(d) illustrate a format of a training signal used in the present invention.

FIGS. 2(b), (c) and (d) indicates a method of discriminating the length of the second training signal from the first training signal.

Figure 1A:
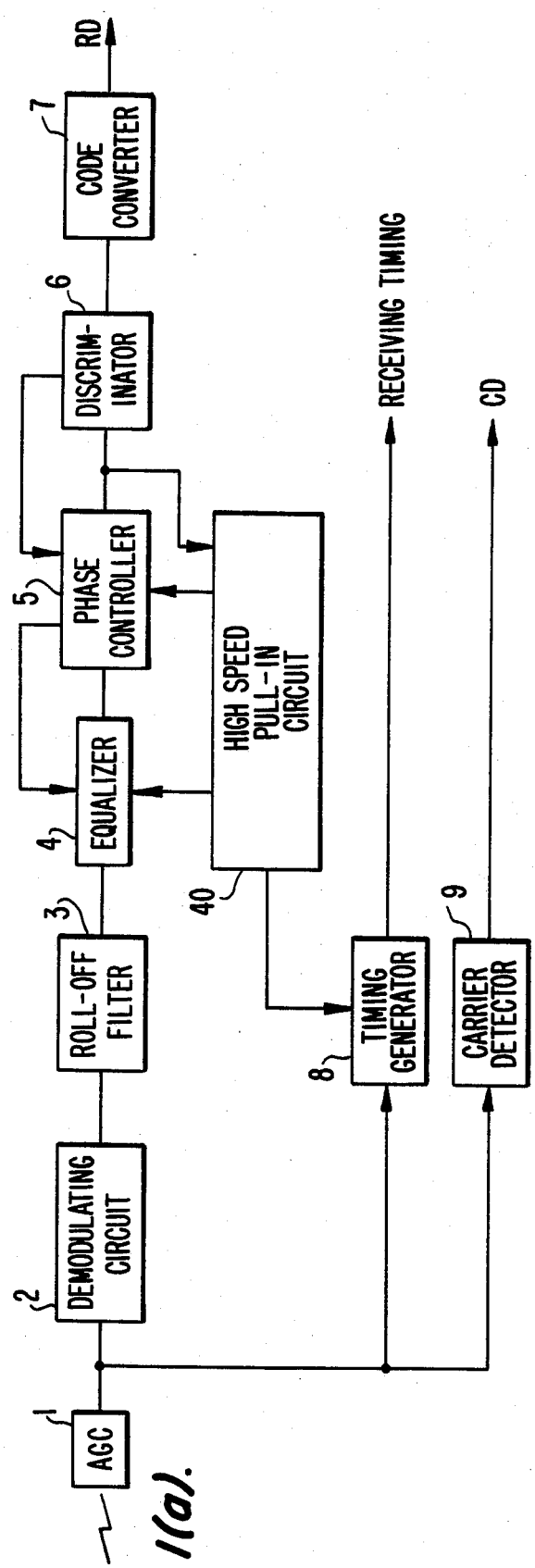
FIG. 1a is a block diagram of a receiver.
Figure 1B:
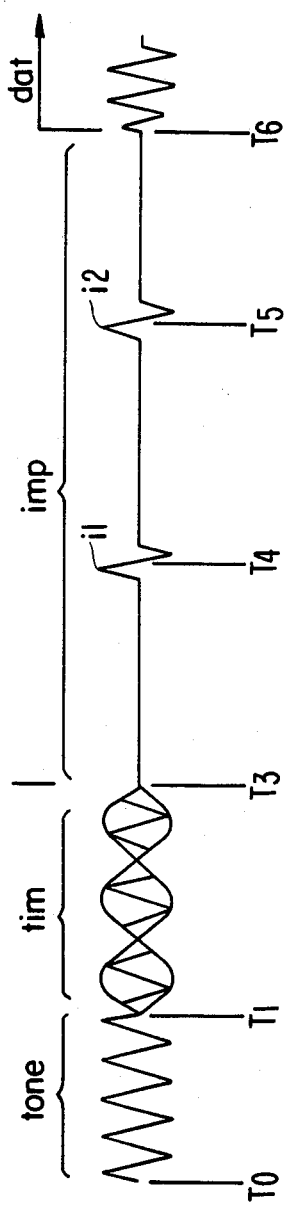
FIG. 1b is a timing diagram of a training signal.

In these figures, the signals corresponding to the signals used in FIG. 1 are given the same symbols. Moreover, TR1, TR10, TR11 are first training signals and TR20, TR21 are second training signals.

The second training signal TR21 is applied to a line having a very bad line characteristic, while the second training signal TR20 is applied to a line having a better line characteristic than that of the line to which the training signal TR21 is applied. The pattern which does not have the second training signal shown in FIG. 2(b) is applied to a line having good line characteristic, in other words, to the line having a good line quality, for example, to a short-distance transmission line.

The first training signals TR1~TR11 provide in the training signal pattern, as explained above, the period(-tim) including the carrier signal component tone, timing signal component and the period including the impulse signal 1. Each first training signal is different in the period defined between the tone signal period or timing signal period and appearance of impulse signal "i".

Therefore, the existence and length of the second training signal can be discriminated from the correspondence between each location of such impulse signal "i" and existence or length of the second training signal.

Such discrimination makes possible the detection of the end portion of training signal and thereby the data "dat" to be transferred as the receiving data to the receiving terminal can also be started immediately after the final data segment of the second training signal.

Figure 3:
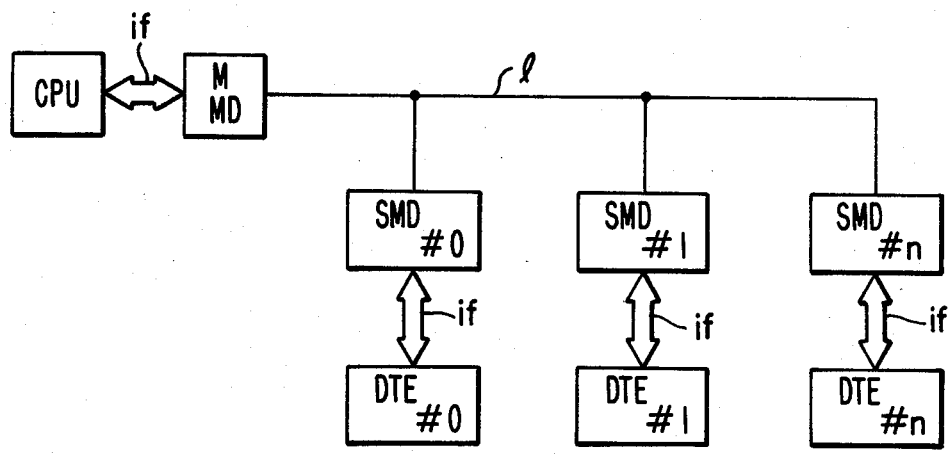
FIG. 3 is a block diagram of a communication system to which the training method of present invention is applied.

FIG. 3 indicates a block diagram of a communication system to which the present invention is applied.

In the figure, MMD indicates the main modem, SMD#o SMD#n indicate station modems, CPU indicates a center equipment, DTE#o~DTE#n indicate terminal equipment and numeral 1 indicates the transmission line.

The center equipment CPU exchanges data with terminal equipment DTE#i(i=1, 2, 3, ..., n) and, for example, the center equipment makes accesses to freely selected terminal equipment and exchanges data with the designated terminal equipment utilizing polling and selecting procedures.

Meanwhile, when a communication line 1 and modems MMD, SMD#1 exist between such center equipment CPU and terminal equipment DTE#1, the center equipment or terminal equipment opposing to modem MMD or SMD#i performs exchanges of data through said polling and selecting procedures under the condition that it is in the condition of being ready for transmission and reception of data between lines through the known interface procedures "if".

Here, transmission of data from the terminal equipment DTE#1 to the center equipment CPU is explained as an example.

The terminal equipment DTE#1 activates the send request signal line among the interface lines if connected for the station modem SMD#1. The station modem SMD#1 receives the send request signal and supplies the training signal to the line 1 responding to such request.

The training signal is predetermined in accordance with the line characteristic or length of the line extended between the station modem SMD#1 and main modem MMD. For example, the training signal shown in FIG. 2(c) is used. It is also possible to provide a means for automatically changing the training signal in accordance with the line characteristic or to provide a means for the manual setting it by an operator in the side of station modem SMD and thereby to generate a particular training signal.

When a training signal is sent to the line 1, the station modem SMD#1 issues a signal to the "send allowing" signal line of the interface lines connected to the terminal equipment DTE#1. Upon receiving such "send allowing" signal, the terminal equipment DTE#1 serially supplies, based on such signal, the data to be sent via the center equipment CPU to the modem SMD#1 through the interface line if, at the constant timing. The station modem SMD#1 modulates the carrier signal based on such send data transferred by the constant timing and supplies it to the line.

Upon sending all send data, the terminal equipment DTE#1 deactivates the send request signal line.

After detecting deactivation of the line, the station modem SMD#1 executes the send termination sequence to the line 1. For example, after the final send data is transmitted, the data is held at a polarity of "Z" for a specified period.

After this signal is sent to the line 1, supply of the carrier signal to the line 1 is terminated.

On the other hand, the main modem MMD always supervises the signal supplied from the line 1 and as explained above, when the training signal and data signal are received from the station modem SMD#1, the main modem MMD operates as explained below.

First, it detects the tone signal of the tone signal period of the training signal and activates the carrier detection signal line in the interface lines "if" connected to the center equipment CPU. Thereby, it is informed to the center equipment CPU that the data is to be received.

Moreover, the main modem MMD starts the self-training using such training signal. Namely, it pulls the phase of carrier signal using said first training signal TR1 (or TR10, TR11), regenerates the timing signal of send data, initializes equalizing coefficient of an automatic variable equalizer and thereby adjusts the phase control circuit.

Moreover, in accordance with the present invention the first training signal is discriminated. In this example, the discriminating function, described later discriminates the first training signal based on the number of data symbols appearing until generation of the impulse signal from regeneration of the timing signal. The result discriminated indicates the existence or non-existence of the second training signal or signal length.

In the case of this example, as explained above, the station modem SMD#1 generates a training signal pattern indicated in FIG. 2(c). Therefore, the main modem MMD uses the second training signal as the training information of each part of it without transferring it as the receiving data to the center equipment. Moreover, when the second training signal in such a length as conforming to the above discrimination is received, the main modem MMD demodulates the data signal appearing next to the second training signal, equalizes the line, converts the code in order to regenerate the data generated by the terminal equipment DTE#1. Thereafter, the main modem MMD supplies such regenerated data as the receiving data to the interface signal line.

Figure 5:
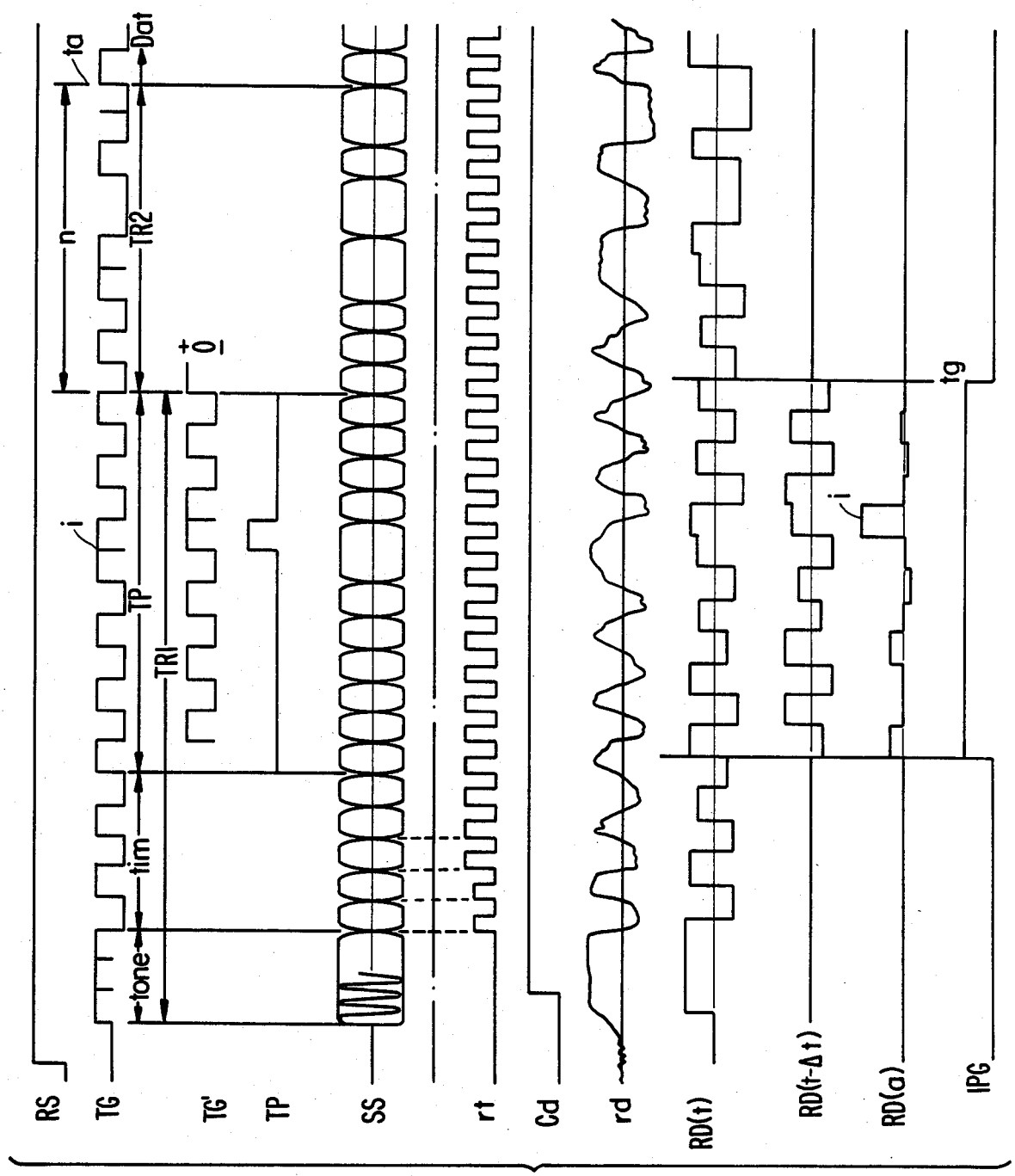
FIG. 5 is a time chart of an output signal of each block in FIG. 4(a) and in FIG. 4(b).

FIGS. 4(a) and (b) and FIG. 5 are block diagrams of an embodiment embodying the present invention and the time chart thereof.

FIG. 4(a) is a block diagram of the sending modem, while FIG. 4(b) is a block diagram of a receiving modem, namely the main modem MMD.

In this explanation, it is presumed that the training signal generated by the station modem SMD#i is uniquely determined in accordance with the line distance and is preset by the equipment supplier when the modem is installed and connected to the line L. In this case, furthermore, consideration should be account so that the station modem SMD#0 located near to the main modem MMD shown in FIG. 3 generates the training signal (having the format shown in FIG. 2(b)) providing only the first training signal, the next nearer station modem SMD#1 generates a signal composed of the n-symbol binary random code as the second training signal and moreover the furthest station modem SMD#n generates a signal composed of the m-symbol (m>n) binary random code as the second training signal.

Moreover, the impulse generating position in the first training signal is determined corresponding to the charactristic of the line between the main modem and station modem or the length of transmission line. In this embodiment, it is also presumed, for the station modem SMD#0 in FIG. 3, that the distance (number of symbols) from the starting symbol of the impulse component period becomes shorter (smallest) and the numbering of modem increases like #1, #2, ..., such distance becomes longer (larger).

In FIG. 5, RS represents a send request signal, TG represents a training signal, TG' represents a training signal delayed as long as one symbol, TP represents an impulse signal, SS represents a send signal. Of above signals, the signals other than TG' and TP are generated by the station modems, for example, SMD#1 and terminal equipment DTE#1 explained in regard to FIG. 3.

In addition, "rt" represents a receiving timing signal, "cd" represents a carrier detection signal, "rd" represents analog demodulated signal, RD(t) represents a demodulated digital signal, RD(t - ot) represents a demodulated digital signal delayed as long as one data symbol time t, RDa represents a recovered impulse signal, IPG represents a gate signal. These signals are processed in the receiving side.

In FIG. 4(a), RS represents a send request signal line, CS represents a send allowing signal line, SD represents a send data line, 1S represents an interface control circuit, 2S represents a sequencer, 3S represents a multiplexer, 4S represents a first training data generator, 5S represents a "Z" data generator, 6S represents a scrambler, 7S represents a modulator, 8S represents an interface circuit, L represents a transmission line.

In FIG. 4(b), 8M represents a line interface circuit including an AGC 1, a filter 3, a timing generator 8 and carrier detector 9 explained by way of FIG. 1(a).

Moreover, 41 represents an impulse generator, 42 represents a training signal discriminator, 43 represents a sequencer, 44 represents a control circuit, 45 is an AND gate, IM represents an interface control circuit.

In the case of this embodiment, a training pattern in the impulse period IP (FIG. 5) including the impulse component alternately changes the polarity of data for each unit data symbol and assures reversibility of data at the specified symbol position si, namely allows transfer of phase of 180°.

In this training pattern, since data is being transmitted in the impulse period IP, transmitting equipment is capable of transmitting the carrier signal component and timing signal component even in such period IP. Therefore, unlike the conventional method, it is certain that the carrier signal component and timing signal component can be transmitted even in such impulse period IP.

The impulse component can be extracted from such training pattern by the following steps.

First, the impulse period IP is delayed as long as one data symbol timing.

The signal GT' thus obtained and the old signal TG are added. In accordance with a result of such addition, the impulse component can be extracted like a signal TP at the symbol position transferred by 180°.

If the signal is distorted by the line characteristic, distortion is increased in such a transferred position due to fluctuation of impulse response resulting from line characteristic. Therefore, the pull-in processing similar to that realized by direct transmission of impulse to the line, which is already known, is used by generating impulse in the receiving side in the same manner.

In FIG. 4(b), the impulse generator 41 provides a tap delay register 411 which delays signal for one data symbol period and an adder 412 as explained above. The switch 410 of the impulse generator connects an input to the output terminal 410a during such impulse period IP in view of executing such calculation and connects as input to the output terminal 410b during other period.

The sequencer 43 counts the fall of the receiving timing signal "rt" and sets each output to level 1 in case a counted result corresponds to the operation period the equipment unit. The training signal discriminator 42 counts up the falls of receiving timing signal "rt" during the period until generation of impulse from the timing where the sequence 43 raises the gate signal IPG which designates the impulse period IP. In accordance with this counted value, the training signal discriminator 42 outputs length data for the second training signal TR2 to the controller 44.

The controller 44 discriminates the length of the training signal TR1 and that of the training signal TR2 in accordance with such length data. The controller 44 outputs, based on such discrimination, the timing "tg" for raising the gate signal IPG, the data "dat" start timing "td" and the signal for adjusting the calculation start timing "ta" of the high speed pull-in circuit 40. In addition, the controller 44 opens the gate 45 which was closed by the data start timing signal "td" sent from the sequencer 43 and supplies it to the terminals as a receiving data.

Moreover, the variable equalizer 4 provides tap delay registers $T_1 \sim T_r$, compensated coefficient registers $C_1 \sim C_r$ and compensated arithmetic operator EQP.

In the embodiment shown in FIG. 4 and in FIG. 5, signals are indicated as the actual signals and the circuit structure is simplified in view of simplifying explanation.

However, in the communication system employing the FSK modulation system, QAM modulation, each equipment, unit and circuit must employ the complex operation processing mechanism, conforming to the present invention or this embodiment.

Herein, transmission of data to the center CPU from the terminal DTE#1 shown in FIG. 3 will be explained by referring to FIGS. 4(a), (b) and FIG. 5. With reference to FIG. 4(a) and FIG. 5:

On the occasion of sending data, the terminal DTE#1 activates first the send request signal line RS. The interface control circuit 1S starts the sequencer 2S when such line RS is activated. The sequencer 2S counts up the timing pulse "tm" and raises an output level of the output terminal a in accordance with such counted value.

Thereby, the first training data generator 4S and modulator 7S operate. At this time, the multiplexer 3S is preset to the connection mode in order to supply an output data of the first training data generator 4 to the modulator 7S. The first training data generator 4S supplies the first training data to the multiplexer 3S at the timing of the timing signal, namely at the unit data symbol timing, since said first training data of the tone period tone, timing period "tim" and impulse period IP among the signal TG indicated in FIG. 5 is preset from the setting circuit 9S.

With the data supplied through the multiplexer 3S, the modulator 7S modulates the carrier signal and supplies an output to the line interface circuit 8S.

The line interface circuit 8S limits frequency bandwidth of the signal supplied and sends it to the line L.

When the first training data generator 4S has completed generation of data as long as all periods (tone, tim, IP) explained above, the sequencer 2S drops the level of output terminal a and raises the level of output terminal b.

When the level of output terminal a rises, the first training data generator 4S becomes inoperative.

However, the modulator 7S sustains the operating condition, because the circuit is so structured that the modulator 7S responds only to rise of level for the signal output to the output terminal a.

Meanwhile, when the level of output terminal b rises, the Z generator 5S, scrambler 6S and multiplexer 3S operate.

Thereby, the Z generator 5S supplies the Z data (data of level 1) as many as those being set to the setting circuit 9S to the scrambler 6S for each supply of the timing pulse "tm".

As explained above, the setting circuit 9S is set when this station modem is set to the position of the terminal DTE#1, but when it is once set, it is no longer possible for operator to change the setting position.

The scrambler 6S scrambles the Z data and converts it to pseudo random code and supplies it to the multiplexer as the signal of the period TR2 of the signal TG shown in FIG. 5.

The multiplexer 3S supplies the data of scrambler to the modulator 7S when the level of terminal b of sequencer 2S rises.

The sequencer 2S lowers the level of the output terminal b and raises, instead, the level of output terminal c at the timing where the data symbol number n of the second training signal is output from the scrambler 6S.

When the level of output terminal b falls, the Z generator 5S and scrambler 6S become inoperable.

On one hand, when the level of terminal c rises, the interface control circuit 1S operates. On the other hand, the multiplexer 3S connects the send data line SD of the interface control circuit 1S to the input of modulator 7S.

In case the interface control circuit 1S is operated by rise of the level of terminal c it raises the signal level of the send allowing signal line CS for the terminal DTE#1. Thereby, it requests transmission of data to the terminal DTE#1.

The data sent from the terminal DTE#1 is supplied to the signal line SD and then supplied to the modulator 7S through the interface control circuit 1S and the multiplexer 3S.

The signal SS shown in FIG. 5 is sent to the line L through the operations explained above. With reference to FIG. 4(b) and FIG. 5:

In the main modem (FIG. 4(b)), a send signal is supplied to the line interface circuit 8M from the line L. This send signal is equivalent to the send signal SS distorted in accordance with the delay characteristic and the frequency characteristic of transmission line.

The line interface circuit 8M regenerates the carrier signal from the received signal, outputs a detected output "cd", regenerates a receiving timing signal "rt" and moreover regenerates a receiving base band signal "rd".

A detected output "cd" is supplied to the interface control circuit 1M and it is informed to the center equipment CPU that data has been received. A detected output "cd" operates the sequencer 43.

The sequencer 43, when operated by the detected output "cd", counts up the received timing signal "rt" and raises output signal level of the output terminals a, b and c at the specified timing in accordance with such counted value.

The sequencer 43 considers, when the timing signal "rt" shown in FIG. 5, for example, is counted up to "5", that the timing period of signal TG has come to the end and raises the level of terminal a. The switch 410 operates thereby and the training signal discriminator 42 also operates. The switch 410 supplies, as explained above, the signal of the impulse period IP to the delay register 411 and adder 412. Thereby, an impulse is generated at the specified timing position, namely at the timing position determined by the station modem in the sending side.

The training signal discriminator 42 counts the send timing signal "rt" during the impulse signal "i" is supplied from the adder 412 from the timing where the signal IPG of terminal a rises. Moreover, the training signal discriminator 42 makes an access to the memory not indicated in accordance with the address generated on the basis of such counted value when the impulse signal "i" is supplied. The pertinent memory stores, in the storage region corresponding to a counted value, the timing data with which the high speed phase lock circuit 40, the end timing data of first training data, the start timing data of second training data TR2, the end timing data of second training data TR2 and the start timing data of sending data "dat". When access to the pertinent memory is carried out, respective data mentioned above are supplied in parallel to the controller 44. The controller 44 supplies this data to the sequencer 43 and adjusts respective timings, namely the start timing of high speed phase lock circuit 40, the end timing of first training data TR1, the start timing of second training data TR2, the end timing of second training data TR2 and the start timing of data.

The sequencer 43 is composed of a counter which counts falls of receiving timing signal "rt" and a register to which data is sent from said controller 44, comprising a plurality of registers to which a count value of said counter is set and a gate circuit which compares count values of each register and counter and outputs comparison result to each output terminal. Therefore, each timing can be adjusted since a value to be stored in this register is adjusted by the controller 44 in accordance with discrimination result of the training signal discriminator 42.

The variable equalizer 4 receives the signal in the impulse period IP from the impulse generator 41.

The supplied signal is sequentially shifted and stored in the delay registers T1~Tr within the variable equalizer 4.

The sequencer 43 falls an output signal of the output terminal a at the timing where all data of impulse period IP and simultaneously outputs pulses to the output terminal b.

The high speed pull-in circuit 40 is operated by the pulse at the output terminal b, reads all data including impulse of the impulse period IP to be stored in the delay registers T1~Tr of the variable equalizer 4 and starts arithmetic operation.

The switch 410 in the impulse generator 41 restores when the signal IPG falls and directly supplies the receiving base band signal "rd" to the variable equalizer 4.

Thereby, the second training signal TR2 is delayed and is sequentially shifted to the delay registers T~Tr.

As described above, the high speed pull-in circuit 40 obtains a compensated value through calculation with the arithmetic operation method disclosed in the specification of the U.S. Pat. No. 3,962,637, based on the data read and stores such compensated data to the compensating counter registers C1~Cr corresponding to each delay register.

The variable equalizer 4 is a so-called a transversal type filter, providing plural stages of delay registers in view of eliminating an inter-symbol interference due to the signal received before and after the signal to be equalized and regenerated from said signal. Therefore, the high speed pull-in circuit 40 desirably generates each coefficient while the heading signal of second training signal is shifted to almost the center of the delay registers of plural stages and sets it to the registers C1~Cr.

The variable equalizer 4 starts equalization of lines when a compensated coefficient is set into the registers C1~Cr.

Namely, the operation circuit EQP supplies a signal which is considered to be regenerated to the phase controller 5 using both data stored in the registers C1~Cr and the receiving data of delay registers T1~Tr.

In the same way as mentioned above, the phase controller 5, discriminator 6 and code converter 7 operate. In addition, the variable equalizer 4 fine-adjusts the compensated coefficient of registers C1~Cr and control itself so that it follows the line characteristic through the feed-back of a signal from the phase controller.

The line characteristic is almost perfectly equalized by the receiving signal of second training signal TR2.

The sequencer 43 outputs a pulse to the terminal c at the end timing of second training signal TR2.

The controller 44 opens the gate 45 which has been closed in accordance with such a pulse. Thereby, the sending data "dat" code-converted by the code converter 7 is supplied to the interface control circuit 1M through the gate 45.

The interface control circuit 1M supplies a sending data "dat" supplied to the center CPU as a receiving data RD.

As explained above, the line interface circuit and variable equalizer in the receiving side can be pulled at the optimum time and speed corresponding to the line used by the first and second training signals sent from the station modem SMD#1 in the sending side. Moreover, it also becomes possible to directly transfer the data sent from the terminal to the center CPU in the receiving side immediately after training.

In the above explanation of the embodiment, the number of data symbols of first training signal is different in each station modem but it may be the same.

The present invention explained above ensures the following effects.

(a) Since the length(period) of the training signal can be set to an optimum and minimum value corresponding to the line characteristic, the line characteristic can be locked perfectly within the shortest period to the receiving modem even when it is connected to any kind of transmission line.

(b) Since a receiving modem is capable of accurately discriminating the final position of the training signal or the starting position (timing) of send data generated by the sending terminal even when the length of the training signal has changed, it is not necessary to send data identifying the starting position of sending data.

Moreover, according to the embodiment, the training data is transmitted from the sending side even during the impulse period and therefore the timing signal and carrier signal components can be extracted in the receiving side and accordingly asynchronization avoided.

I claim:

1. A training method for a data receiving system inclucing data terminal equipment, receiving equipment and a line, having characteristics, connecting the data terminal equipment and the receiving equipment, said method comprising the steps of:
transmitting via the data terminal equipment a training signal having a length selected in accordance with the line characteristics and including information indicating said length and then;
transmitting, via the data terminal equipment, data;
training the receiving equipment in accordance with the training signal; and
switching the receiving equipment from receiving the training signal to receiving the data signal in accordance with the information indicating said length of the training signal.

2. A training method of data receiving equipment according to claim 1 wherein said method further comprises the substeps of:
transmitting a first part said training signal including information indicating the length, followed by
transmitting a second part of said tranining signal for a length of time selected in accordance with characteristics of the line.

3. A training method of data receiving equipment according to claim 2 further including the substeps of transmitting the first part of the training signal so as to include an impulse component.

4. A training method of data receiving equipment according to claim 2 further including the substep of transmitting the second part of the training signal so as to include a binary random code selected in accordance with the characteristics of the line.

5. A training method of receiving equipment according to claim 3 further including the substep of transmitting said impulse component at a time within said first part of the training signal so as to define said information indicating the length.

* * * * *

UNITED STATES PATENT AND TRADEMARK OFFICE
CERTIFICATE OF CORRECTION

PATENT NO. : 4,672,630

DATED : June 9, 1987

INVENTOR(S) : Kaku

It is certified that error appears in the above-identified patent and that said Letters Patent is hereby corrected as shown below:

Col. 1, line 49, "system the" should be --system,--.

Col. 3, line 66, "having" should be --having a--.

Col. 4, line 20, "SMD#o" should be --SMD#0--;

line 21, "DTE#o" should be --DTE#0--.

Signed and Sealed this

Third Day of May, 1988

*Attest:*

DONALD J. QUIGG

*Attesting Officer*      *Commissioner of Patents and Trademarks*